(12) United States Patent
Nozaki et al.

(10) Patent No.: US 6,564,607 B2
(45) Date of Patent: May 20, 2003

(54) METHOD AND DEVICE FOR CUTTING A SHEET MATERIAL INTO STRIPS AND A CORRUGATED-FIN STRIPS FORMING APPARATUS USING THE DEVICE

(75) Inventors: Kimio Nozaki, Kanagawa (JP); Kenji Tochigi, Kanagawa (JP)

(73) Assignee: Calsonic Kansei Corporation, Tokyo (JP)

( * ) Notice: Subject to any disclaimer, the term of this patent is extended or adjusted under 35 U.S.C. 154(b) by 45 days.

(21) Appl. No.: 09/961,688

(22) Filed: Sep. 25, 2001

(65) Prior Publication Data

US 2002/0035904 A1 Mar. 28, 2002

(30) Foreign Application Priority Data

Sep. 26, 2000 (JP) .......................................... 2000-292668

(51) Int. Cl.[7] .............................................. B21D 13/00
(52) U.S. Cl. .............................. 72/185; 72/203; 83/500
(58) Field of Search ......................... 83/176, 500, 501; 72/129, 203, 204, 185, 186

(56) References Cited

U.S. PATENT DOCUMENTS 2,286,675 A * 6/1942 Gibbons ...................... 83/500
4,157,672 A * 6/1979 Frye ............................. 83/500
4,922,778 A * 5/1990 Nagai ........................... 83/501

FOREIGN PATENT DOCUMENTS

| JP | 6-55224 | 3/1994 |
| JP | 6-114455 | 4/1994 |
| JP | 11-147149 | 6/1999 |

* cited by examiner

Primary Examiner—Lowell A. Larson
(74) Attorney, Agent, or Firm—Foley & Lardner

(57) ABSTRACT

A slitting device including first and second cutting rollers disposed parallel to each other, a first guide roller axially adjacent to the first cutting roller, and a second guide roller axially adjacent to the second cutting roller. The cutting rollers have axially adjacent cutting edges at which a sheet material is cut into two strips, and recessed portions on the outer circumferential surfaces. The guide rollers have cutout portions circumferentially extending and axially opposed to each other on the outer circumferential surfaces, and projections defined by the cutout portions and opposed to the recessed portions of the cutting rollers. The cutting rollers cooperate with the corresponding guide rollers to define therebetween spaces for the strips of the sheet material. The cutting rollers and the guide rollers have a same outer diameter.

20 Claims, 5 Drawing Sheets

METHOD AND DEVICE FOR CUTTING A SHEET MATERIAL INTO STRIPS AND A CORRUGATED-FIN STRIPS FORMING APPARATUS USING THE DEVICE

BACKGROUND OF THE INVENTION

The present invention relates to a slitting device for cutting a sheet material into strips, and a method therefor.

Japanese Patent Application First Publication No. 6-55224 discloses an apparatus for forming corrugated-fin strips for use in a heat exchanger such as a radiator. FIG. 7 shows the apparatus including a tension device 2 for applying tension to a fin material 1, a slitting device 3 for cutting the fin material 1 into two parallel strips, a corrugating device 5 for forming corrugations (fins) in the strips, and a feed device 7 for feeding the strips with the corrugations. Reference numeral 100 denotes a direction of process flow. The fin material 1 fed to the slitting device 3 is cut into the two strips by upper and lower cutting rollers 4, 4. A pair of corrugation cutters 6, 6 of the corrugating device 5 cooperate to form corrugations in the strips of the fin material 1. The strips with corrugations are fed to the feed device 7 in which a pair of feed rollers 8, 8 compress the strips with corrugations for adjusting a fin pitch. Thus, two corrugated-fin strips 9 having the adjusted fin pitch are formed. The two corrugated-fin strips 9 are then fed to a cutting device (not shown) and cut into a predetermined length.

However, in the related art described above, the fin material 1 straightly extends to the corrugating device 5 through a gap between the cutting rollers 4, 4 of the slitting device 3, so that the fin material 1 tends to slip relative to the cutting rollers 4, 4. This will cause difficulties in cutting the fin material 1 into the strips.

SUMMARY OF THE INVENTION

In order to suppress the occurrence of slippage of the fin material 1, it has been proposed to wind the fin material 1 on the cutting rollers 4, 4 so as to form a generally S-shaped path of the fin material 1 as viewed in the axial direction of the cutting rollers 4, 4. However, if the fin material 1 is wound on the cutting rollers 4, 4 in such the manner, the fin material 1 will meander by the following reason. Each of the upper and lower cutting rollers 4, 4 has a larger outer-diameter cutting portion and a smaller outer-diameter guide portion axially adjacent to the larger outer-diameter cutting portion. The larger outer-diameter cutting portion of the upper cutting roller 4 is opposed to the smaller outer-diameter guide portion of the lower cutting roller 4, and the smaller outer-diameter guide portion of the upper cutting roller 4 is opposed to the larger outer-diameter cutting portion of the lower cutting roller 4. The fin material 1 introduced into the gap between the upper and lower cutting rollers 4, 4 is cut at outer peripheral edges of the larger outer-diameter cutting portions which are located axially adjacent to each other. The difference between the outer diameters of the cutting portion and the guide portion of each cutting roller 4 will cause meander of the fin material 1.

There is a demand to solve the above-described problems in the related art. An object of the present invention is to provide method and device for cutting a sheet material into strips which is capable of preventing the occurrence of meander of the sheet material and slippage thereof relative to cutting rollers upon cutting the sheet material into the strips, and to provide a corrugated-fin strips forming apparatus using the device.

According to one aspect of the present invention, there is provided a slitting device for cutting a sheet material into strips, comprising:

a first cutting roller rotatable about a first axis, the first cutting roller including a first cutting edge and a first recessed portion circumferentially extending and radially recessed from an outer circumferential surface thereof;

a second cutting roller rotatable about a second axis parallel to the first axis, the second cutting roller including a second recessed portion circumferentially extending and radially recessed from an outer circumferential surface thereof and a second cutting edge axially adjacent to the first cutting edge and cooperating therewith for cutting the sheet material into the strips;

a first guide roller disposed coaxially with the first cutting roller and adjacent thereto and opposed to the second cutting roller, the first guide roller including first cutout portions circumferentially extending and axially opposed to each other on an outer circumferential surface thereof and a first projection defined by the first cutout portions and opposed to the second recessed portion of the second cutting roller, the first guide roller cooperating with the second cutting roller to define a first space for a first strip of the strips; and a second guide roller disposed coaxially with the second cutting roller and adjacent thereto and opposed to the first cutting roller, the second guide roller including second cutout portions circumferentially extending and axially opposed to each other on an outer circumferential surface thereof and a second projection defined by the second cutout portions and opposed to the first recessed portion of the first cutting roller, the second guide roller cooperating with the first cutting roller to define a second space for a second strip of the strips;

the first cutting roller, the first guide roller, the second cutting roller and the second guide roller having a same outer diameter.

According to a further aspect of the present invention, there is provided an apparatus for forming corrugated-fin strips from a sheet material, comprising:

a slitting device for cutting the sheet material into strips, the slitting device comprising:

a first cutting roller rotatable about a first axis, the first cutting roller including a first cutting edge and a first recessed portion circumferentially extending and radially recessed from an outer circumferential surface thereof;

a second cutting roller rotatable about a second axis parallel to the first axis, the second cutting roller including a second recessed portion circumferentially extending and radially recessed from an outer circumferential surface thereof and a second cutting edge axially adjacent to the first cutting edge and cooperating therewith for cutting the sheet material into the strips;

a first guide roller disposed coaxially with the first cutting roller and adjacent thereto and opposed to the second cutting roller, the first guide roller including first cutout portions circumferentially extending and axially opposed to each other on an outer circumferential surface thereof and a first projection defined by the first cutout portions and opposed to the second recessed portion of the second cutting roller, the first guide roller cooperating with the second cutting roller to define a first space for a first strip of the strips; and a second guide roller disposed coaxially with the second cutting roller and adjacent thereto and opposed to the first cutting roller, the second guide roller including second cutout portions circumferentially extending and axially opposed to each other on an outer circumferential surface thereof and a second projection defined by the second cutout portions and opposed to the first recessed portion of the first cutting roller, the second guide roller cooperating with the first cutting roller to define a second space for a second strip of the strips, the first cutting roller, the first guide roller, the second cutting roller and the second guide roller having a same outer diameter, a corrugating device for forming corrugations in the strips of the sheet material; and a feed device for feeding the strips with corrugations.

According to a still further aspect of the present invention, there is provided a method for cutting a sheet material into strips, comprising:

guiding the sheet material in a first direction so as to form a generally S-shaped path of the sheet material as viewed in section taken along the first direction; and cutting the sheet material into the strips parallel to the first direction at a cutting position spaced from opposed ends of the sheet material in a second direction perpendicular to the first direction, while supporting the sheet material from opposite sides of the sheet material at support positions located in a spaced relation in the second direction, the cutting position being located between the support positions.

DETAILED DESCRIPTION OF THE INVENTION

Referring to FIGS. 1–5, a slitting device of a first preferred embodiment, according to the present invention, is explained. The slitting device can be incorporated into an apparatus for forming corrugated-fin strips from a sheet material.

Figure 1:
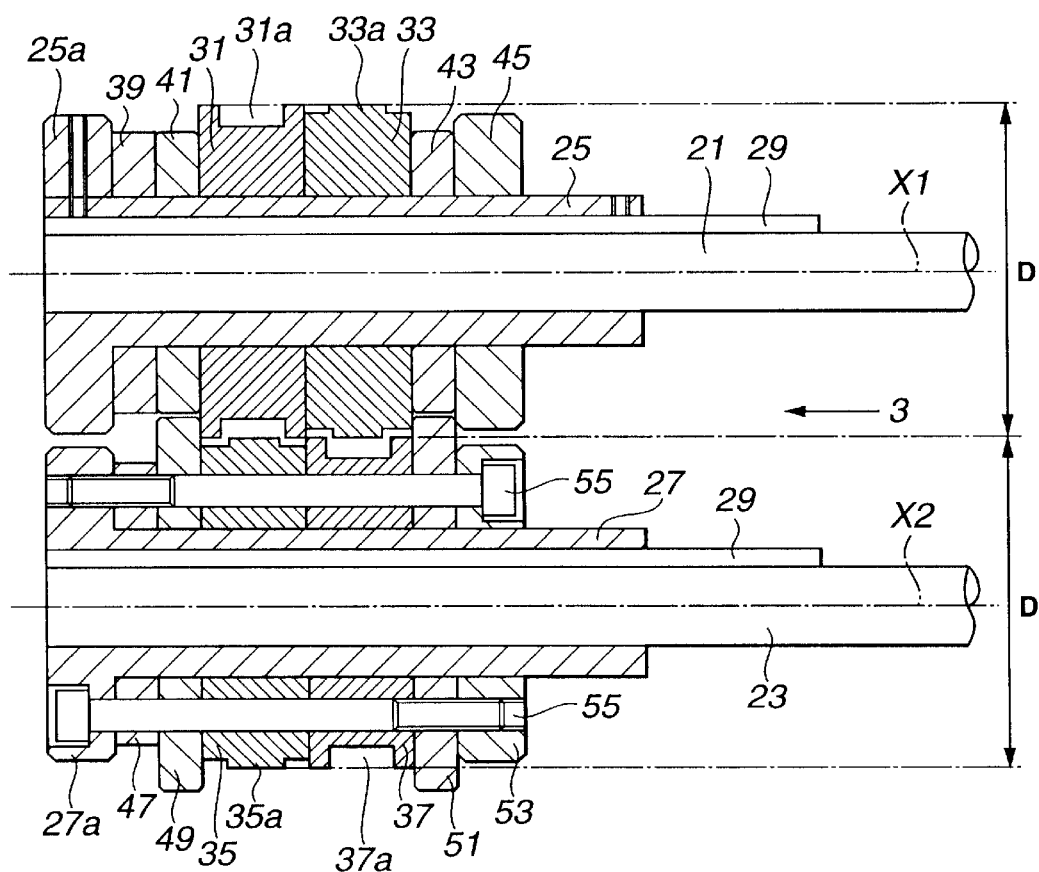
FIG. 1 is a sectional view of a slitting device of a first preferred embodiment, according to the present invention.

As illustrated in FIG. 1, the slitting device includes a first rotating shaft 21 rotatable about a rotation axis X1, and a second rotating shaft 23 rotatable about a rotation axis X2 parallel to the rotation axis X1. Sleeves 25 and 27 are mounted onto the first and second rotating shafts 21 and 23 through keys 29, 29, respectively. A first cutting roller 31 and a first guide roller 33 which are made of metal, are disposed axially adjacent to each other on the sleeve 25 on the first rotating shaft 21. A second guide roller 35 and a second cutting roller 37 which are made of metal, are disposed axially adjacent to each other on the sleeve 27 on the second rotating shaft 23. The first guide roller 33 is radially opposed to the second cutting roller 37. The second guide roller 35 is radially opposed to the first cutting roller 31. The first cutting roller 31, the first guide roller 33, the second guide roller 35 and the second cutting roller 37 have a same outer diameter D and a same axial length.

Figure 2:
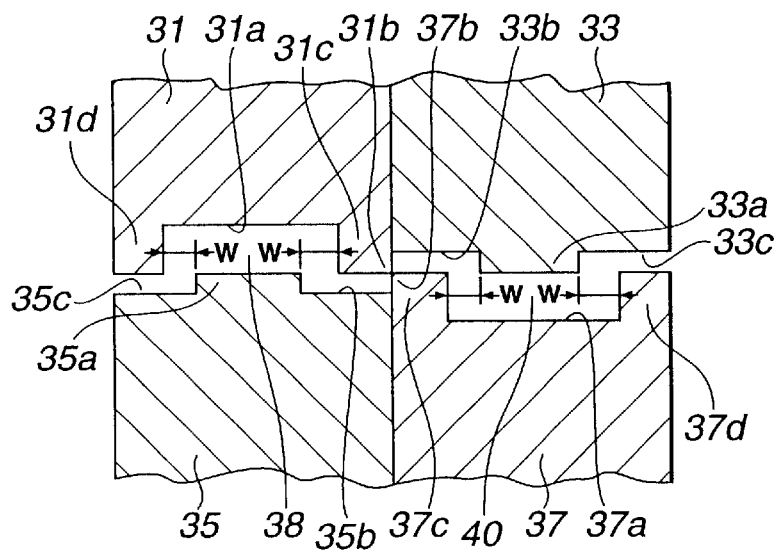
FIG. 2 is a partially enlarged diagram of the slitting device shown in FIG. 1, showing cutting rollers and guide rollers.

Specifically, as illustrated in FIG. 2, the first cutting roller 31 has an annular recessed portion 31a circumferentially extending and radially recessed from an outer circumferential surface thereof, and a cutting edge 31b on an outer circumferential edge thereof at the position axially adjacent to a cutting edge 37b of the second cutting roller 37. The recessed portion 31a defines protrudent portions 31c and 31d extending radially and circumferentially and axially opposed to each other. The cutting edge 31b is positioned at a corner of the protrudent portion 31c.

The second cutting roller 37 has an annular recessed portion 37a circumferentially extending and radially recessed from an outer circumferential surface thereof. The recessed portion 37a defines protrudent portions 37c and 37d extending radially and circumferentially and axially opposed to each other. The protrudent portion 37c has an outer circumferential face axially aligned with an outer circumferential face of the protrudent portion 31c of the first cutting roller 31. The cutting edge 37b is positioned at a corner of the protrudent portion 37c. The cutting edge 37b cooperates with the cutting edge 31b of the first cutting roller 31 to cut a sheet material into two strips as explained later.

The first guide roller 33 has cutout portions 33b and 33c circumferentially extending and axially opposed to each other on an outer circumferential surface thereof, and a radially and circumferentially extending projection 33a defined by the cutout portions 33b and 33c. The cutout portions 33b and 33c are radially spaced from the protrudent portions 37c and 37d of the second cutting roller 37. The projection 33a is arranged in a radially spaced and opposed relation to the recessed portion 37a of the second cutting roller 37. The projection 33a and the recessed portion 37a cooperate with each other to define axial clearances W. W between axially opposed end faces thereof. The axial clearances W, W are set greater than a thickness of the sheet material. The projection 33a has an outer circumferential face axially aligned with the outer circumferential faces of the protrudent portions 31c and 31d of the first cutting roller 31. The first guide roller 33 cooperates with the second cutting roller 37 to define a space 40 between the outer circumferential surfaces within which one of the two strips of the sheet material is disposed.

The second guide roller 35 has cutout portions 35b and 35c circumferentially extending and axially opposed to each other on an outer circumferential surface thereof, and a radially and circumferentially extending projection 35a defined by the cutout portions 35b and 35c. The cutout portions 35b and 35c are radially spaced from the protrudent portions 31c and 31d of the first cutting roller 31. The projection 35a is disposed in a radially spaced and opposed relation to the recessed portion 31a of the first cutting roller 31. The projection 35a and the recessed portion 31a cooperate with each other to define axial clearances W, W between axially opposed end faces thereof. The axial clearances W, W are greater than the thickness of the sheet material. The projection 35a has an outer circumferential face axially aligned with the outer circumferential faces of the protrudent portions 37c and 37d of the second cutting roller 37. The second guide roller 35 cooperates with the first cutting roller 31 to define a space 38 between the outer circumferential surfaces within which the other of the two strips of the sheet material is disposed. The outer diameters D of the first cutting roller 31, the first guide roller 33, the second guide roller 35 and the second cutting roller 37 mean diameters measured on outer-most perimeters of the rollers 31, 33, 35 and 37, namely, on the outer circumferential faces of the protrudent portions 31c, 31d, projection 33a, projection 35a and protrudent portions 37c, 37d.

Referring back to FIG. 1, the sleeve 25 on the first rotating shaft 21 has an integral flange 25a at one axial end thereof. Two spacers 39 and 41 are mounted onto the sleeve 25 between the flange 25a and the first cutting roller 31. A spacer 43 is mounted onto the sleeve 25 in an axially adjacent relation to the first guide roller 33. A connecting member 45 is disposed axially adjacent to the spacer 43 on the sleeve 25. Thus, the spacers 39 and 41, the first cutting roller 31, the first guide roller 33 and the spacer 43 are arranged in series between the flange 25a of the sleeve 25 and the connecting member 45 and connected together by bolts (not shown). The sleeve 27 on the second rotating shaft 23 has an integral flange 27a at one axial end thereof. Two spacers 47 and 49 are disposed on the sleeve 27 between the flange 27a and the second guide roller 35. A spacer 51 and a connecting member 53 are successively disposed on the sleeve 27 in an axially adjacent relation to the second cutting roller 37. The spacers 47 and 49, the second guide roller 35, the second cutting roller 37 and the spacer 51 are in series connected between the flange 27a of the sleeve 27 and the connecting member 53 by bolts 55. The spacers 49 and 51 between which the second guide roller 35 and the second cutting roller 37 are interposed, have an outer diameter larger than outer diameters of the second guide roller 35 and the second cutting roller 37 and the spacers 39, 41, 43 and 47. The sheet material is disposed between outer peripheral portions of opposed axial end faces of the spacers 49 and 51 and guided therealong.

Figure 3:
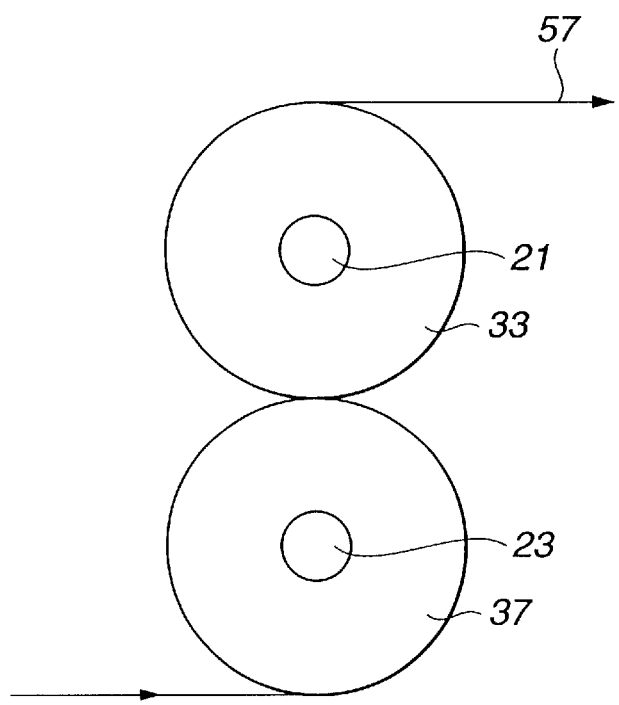
FIG. 3 is an explanatory schematic diagram showing a sheet material wound on the rollers as viewed in a direction of arrow 3 of FIG. 1
Figure 4:
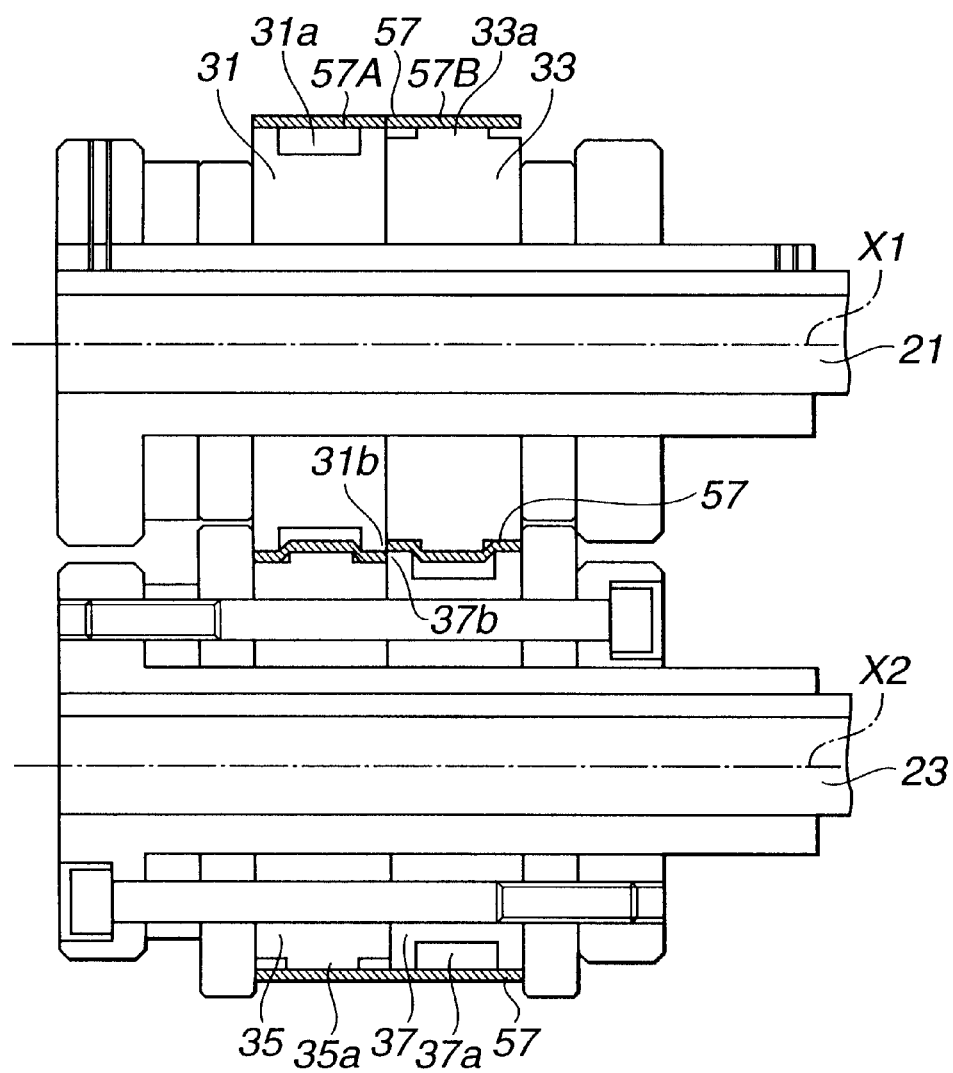
FIG. 4 is an explanatory schematic diagram showing the sheet material wound on the rollers, in section taken along rotation axes of the rollers.
Figure 5:
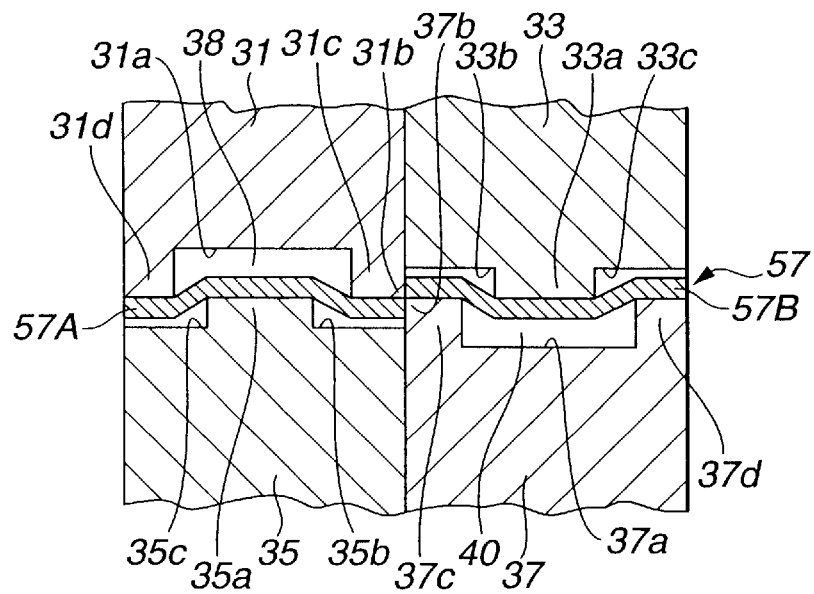
FIG. 5 is an explanatory diagram showing cutting the sheet material by the rollers.

Referring to FIGS. 3–5, an operation of the slitting device of the first embodiment is explained. The sheet material can be used as a fin material of corrugated-fin strips which may be made of aluminum. As illustrated in FIG. 3, the sheet material indicated at 57 is fed in the feed direction indicated by arrow. At this time, the first cutting roller 31, the first guide roller 33, the second guide roller 35 and the second cutting roller 37 rotate and cooperate to form a generally S-shaped path as viewed in FIG. 3, of the sheet material 57 along the outer circumferential surfaces thereof. The sheet material 57 is wound on the axially adjacent second guide roller 35 and second cutting roller 37 and then the axially adjacent first cutting roller 31 and first guide roller 33 so as to form the generally S-shaped path of the sheet material 57. As illustrated in FIG. 5, upon winding the sheet material 57, the sheet material 57 is introduced between an upper-roller set of the first cutting roller 31 and the first guide roller 33, and a lower-roller set of the second guide roller 35 and the second cutting roller 37, and cut into two strips 57A and 57B at the axially adjacent cutting edges 31b and 37b of the first and second cutting rollers 31 and 37. The two strips 57A and 57B of the sheet material 57 pass through the spaces 38 and 40, respectively, upon rotation of the rollers 31, 33, 35 and 37. In the cutting state, the sheet material 57 is supported between the cutout portions 33b and 33c of the first guide roller 33 and the protrudent portions 37c and 37d of the second cutting roller 37 and between the protrudent portions 31c and 31d of the first cutting roller 31 and the cutout portions 35b and 35c of the second guide roller 35.

As described above, with the arrangement of the recessed portions 31a and 37a of the first and second cutting rollers 31 and 37 and the corresponding projections 33a and 35a of the first and second guide rollers 33 and 35, the axially adjacent first cutting roller 31 and first guide roller 33 and the axially adjacent second guide roller 35 and second cutting roller 37 respectively have the same outer diameter D. The first and second cutting rollers 31 and 37 are provided with the axially adjacent cutting edges 31b and 37b and radially spaced from the second and first guide rollers 35 and 33 to form the spaces 38 and 40, respectively. In the thus-constructed slitting device, even when the sheet material 57 is wound on the rollers 31, 33, 35 and 37 so as to form the generally S-shaped path, the sheet material 57 can be prevented from meandering and slippage relative to the rollers 31, 33, 35 and 37.

Figure 6:
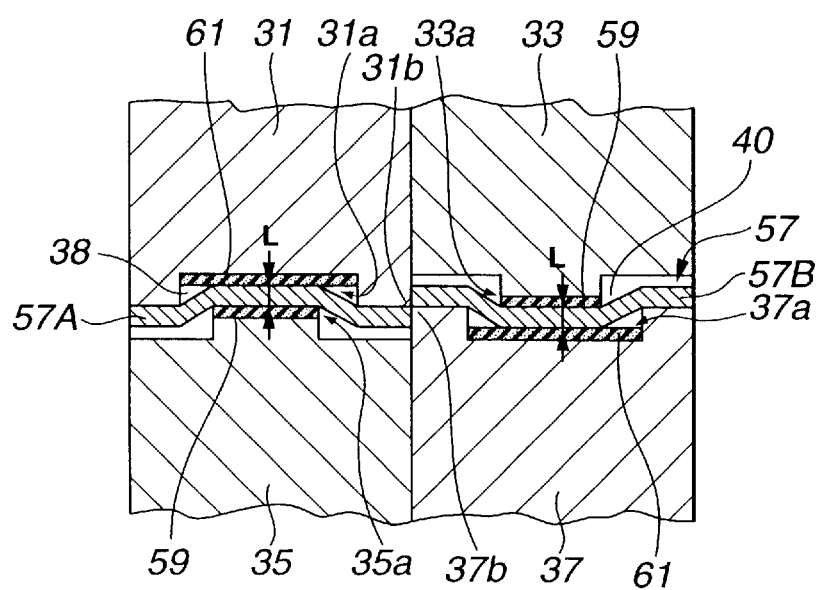
FIG. 6 is a view similar to FIG. 2, but showing a second embodiment of the present invention.

Referring now to FIG. 6, the second embodiment of the slitting device of the invention is explained, which is the same as the above-described first embodiment except that the recessed portions 31a and 37a of the first and second cutting rollers 31 and 37 and the projections 33a and 35a of the first and second guide rollers 33 and 35 have elastic layers 61, 61 and 59, 59, respectively, and that the recessed portions 31a and 37a and the projections 33a and 35a cooperate to define a radial clearance L therebetween which is slightly smaller than the thickness of the sheet material 57. Like reference numerals denote like parts, and therefore, detailed explanations therefor can be omitted.

As illustrated in FIG. 6, the recessed portions 31a and 37a of the first and second cutting rollers 31 and 37 have the elastic layers 61, 61 on bottoms thereof, and the projections 33a and 35a of the first and second guide rollers 33 and 35 have the elastic layers 59, 59 on tops thereof. The elastic layers 61, 61 and 59, 59 are made of a suitable elastic material, such as urethane, and fixedly attached to the bottom faces of the recessed portions 31a and 37a and the top faces of the projections 33a and 35a, respectively, by means of an adhesive or by baking. There exists the radial clearance L between the elastic layers 61, 61 provided on the bottoms of the recessed portions 31a and 37a and the elastic layers 59, 59 provided on the tops of the projections 35a and 37a. The radial clearance L is adjusted slightly smaller than the thickness of the sheet material 57 when the elastic layers 61, 61 and 59, 59 are in a non-deformed state thereof. In the non-deformed state, the elastic layers 61, 61 and 59, 59 are free from contact with the two strips 57A and 57B of the sheet material 57. When the sheet material 57 is cut into the two strips 57A and 57B, the elastic layers 61, 61 and 59, 59 are in contact with the two strips 57A and 57B and deformed into the compressed state shown in FIG. 6, in which the elastic layers 61, 61 and 59, 59 support the strips 57A and 57B of the sheet material 57 within the spaces 38 and 40.

Figure 7:
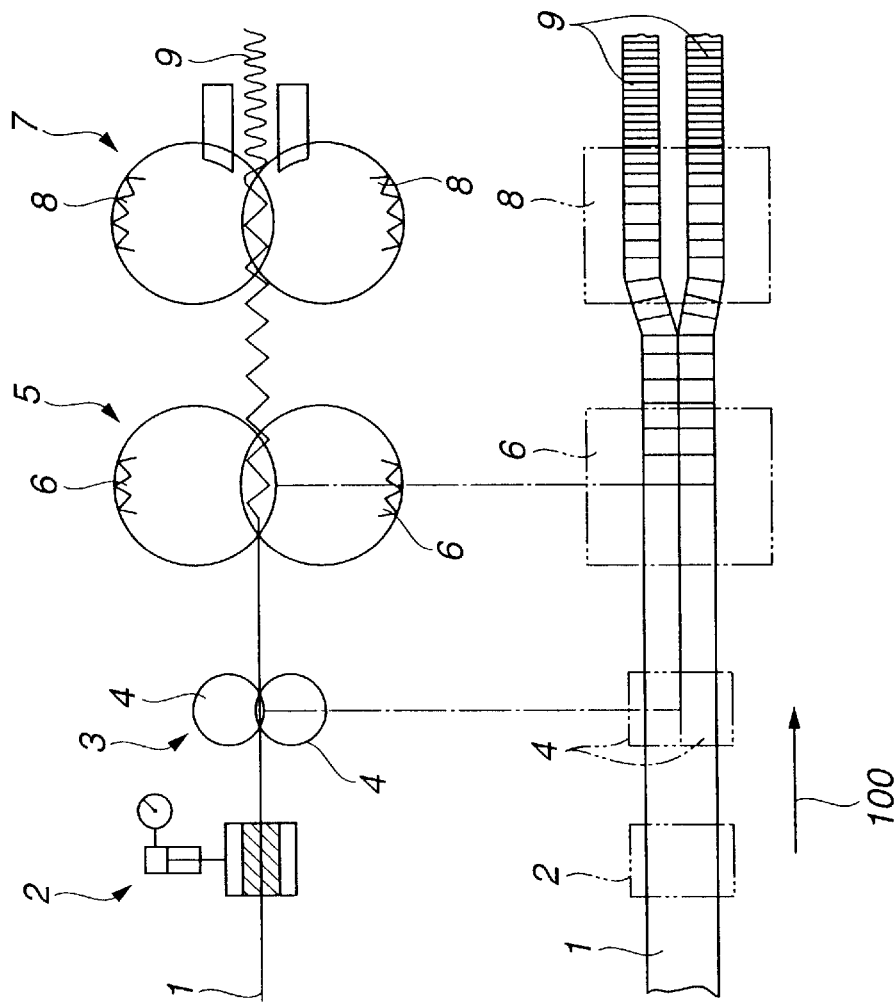
FIG. 7 is a schematic diagram of a corrugated-fin strips forming apparatus using a slitting device of a related art.

With the provision of the elastic layers 61, 61 on the bottoms of the recessed portions 31a and 37a of the first and second cutting rollers 31 and 37 and the elastic layers 59, 59 on the tops of the projections 33a and 35a of the first and second guide rollers 33 and 35, and the adjustment of the radial clearance L between the elastic layers 61, 61 and 59, 59 provided thereon which is slightly smaller than the thickness of the sheet material 57, a frictional force is caused between the sheet material 57 and the elastic layers 61, 61 and 59, 59, so that desirable tension can be applied to the sheet material 57. Accordingly, if the slitting device of the invention is applied to the conventional corrugated-fin strips forming apparatus shown in FIG. 7, the tension device 2 can be omitted.

The arrangement of the elastic layer is not limited to the second embodiment, and the elastic layer may be provided on either one of the recessed portions 31a and 37a of the first and second cutting rollers 31 and 37 and the projections 33a and 35a of the first and second guide rollers 33 and 35.

The slitting device of the invention can be incorporated to not only the corrugated-fin strips forming apparatus but also various apparatus having a function of forming strips from a sheet material.

Next, a method for cutting a sheet material into strips is explained. First, as shown in FIG. 3, the sheet material 57 is guided in the feed direction indicated by arrow so as to form a generally S-shaped path of the sheet material 57. The generally S-shape is in section taken along the feed direction. On the way of guiding, the sheet material 57 is cut into the strips 57A and 57B parallel to the feed direction at a cutting position spaced from opposed ends of the sheet material 57 in a lateral direction perpendicular to the feed direction. Simultaneously, the sheet material 57 is supported from opposite upper and lower sides thereof at support positions located in a spaced relation in the lateral direction. The cutting position is located between the support positions. The sheet material 57 is disposed in a generally zigzag manner as shown in FIG. 5 during cutting, so that the sheet material 57 can be prevented from offset in the lateral direction. The cutting position is indicated at the cutting edges 31b and 37b of the above-described slitting device as shown in FIG. 5. The support positions are indicated at the protrudent portions 31d and 37d and the corresponding cutout portions 35c and 33c of the slitting device as shown in FIG. 5. Further, upon cutting, the sheet material 57 may be elastically supported from the upper and lower sides thereof at auxiliary support positions located between the cutting position and the support positions. The sheet material 57 thus may be elastically supported at the auxiliary support positions. The auxiliary support positions are indicated at the elastic layers 59, 59 and 61, 61 in FIG. 6. The method of the invention can serve for preventing the sheet material 57 from meandering and slippage in the feed direction.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A slitting device for cutting a sheet material into strips, comprising:
   a first cutting roller rotatable about a first axis, the first cutting roller including a first cutting edge and a first recessed portion circumferentially extending and radially recessed from an outer circumferential surface thereof;
   a second cutting roller rotatable about a second axis parallel to the first axis, the second cutting roller including a second recessed portion circumferentially extending and radially recessed from an outer circumferential surface thereof and a second cutting edge axially adjacent to the first cutting edge and cooperating therewith for cutting the sheet material into the strips;
   a first guide roller disposed coaxially with the first cutting roller and adjacent thereto and opposed to the second cutting roller, the first guide roller including first cutout portions circumferentially extending and axially opposed to each other on an outer circumferential surface thereof and a first projection defined by the first cutout portions and opposed to the second recessed portion of the second cutting roller, the first guide roller cooperating with the second cutting roller to define a first space for a first strip of the strips; and
   a second guide roller disposed coaxially with the second cutting roller and adjacent thereto and opposed to the first cutting roller, the second guide roller including second cutout portions circumferentially extending and axially opposed to each other on an outer circumferential surface thereof and a second projection defined by the second cutout portions and opposed to the first recessed portion of the first cutting roller, the second guide roller cooperating with the first cutting roller to define a second space for a second strip of the strips;
   the first cutting roller, the first guide roller, the second cutting roller and the second guide roller having a same outer diameter.

2. The slitting device as claimed in claim 1, wherein at least one of a set of the first and second recessed portions of the first and second cutting rollers and a set of the first and second projections of the first and second guide rollers comprise elastic layers made of an elastic material.

3. The slitting device as claimed in claim 2, wherein the elastic layers are formed on bottoms of the first and second recessed portions of the first and second cutting rollers.

4. The slitting device as claimed in claim 2, wherein the elastic layers are formed on tops of the first and second projections of the first and second guide rollers.

5. The slitting device as claimed in claim 2, wherein the first and second recessed portions of the first and second cutting rollers and the first and second projections of the first and second guide rollers cooperate to define a radial clearance between the elastic layers which is adapted to be smaller than a thickness of the sheet material.

6. The slitting device as claimed in claim 2, wherein the elastic material comprises urethane.

7. The slitting device as claimed in claim 1, wherein the first and second recessed portions of the first and second cutting rollers and the first and second projections of the first and second guide rollers cooperate to define an axial clearance therebetween which is adapted to be greater than a thickness of the sheet material.

8. The slitting device as claimed in claim 2, wherein the first and second recessed portions of the first and second cutting rollers and the first and second projections of the first and second guide rollers cooperate to define an axial clearance therebetween which is adapted to be greater than a thickness of the sheet material.

9. The slitting device as claimed in claim 1, wherein the first cutting roller, the first guide roller, the second cutting roller and the second guide roller are adapted to cooperate in forming a generally S-shaped path of the sheet material along the outer circumferential surfaces.

10. An apparatus for forming corrugated-fin strips from a sheet material, comprising:
   a slitting device for cutting the sheet material into strips, the slitting device comprising:
   a first cutting roller rotatable about a first axis, the first cutting roller including a first cutting edge and a first recessed portion circumferentially extending and radially recessed from an outer circumferential surface thereof;
   a second cutting roller rotatable about a second axis parallel to the first axis, the second cutting roller including a second recessed portion circumferentially extending and radially recessed from an outer circumferential surface thereof and a second cutting edge axially adjacent to the first cutting edge and cooperating therewith for cutting the sheet material into the strips;

a first guide roller disposed coaxially with the first cutting roller and adjacent thereto and opposed to the second cutting roller, the first guide roller including first cutout portions circumferentially extending and axially opposed to each other on an outer circumferential surface thereof and a first projection defined by the first cutout portions and opposed to the second recessed portion of the second cutting roller, the first guide roller cooperating with the second cutting roller to define a first space for a first strip of the strips; and a second guide roller disposed coaxially with the second cutting roller and adjacent thereto and opposed to the first cutting roller, the second guide roller including second cutout portions circumferentially extending and axially opposed to each other on an outer circumferential surface thereof and a second projection defined by the second cutout portions and opposed to the first recessed portion of the first cutting roller, the second guide roller cooperating with the first cutting roller to define a second space for a second strip of the strips, the first cutting roller, the first guide roller, the second cutting roller and the second guide roller having a same outer diameter, a corrugating device for forming corrugations in the strips of the sheet material; and a feed device for feeding the strips with corrugations.

11. The apparatus as claimed in claim 10, wherein at least one of a set of the first and second recessed portions of the first and second cutting rollers and a set of the first and second projections of the first and second guide rollers comprise elastic layers made of an elastic material.

12. The apparatus as claimed in claim 11, wherein the elastic layers are formed on bottoms of the first and second recessed portions of the first and second cutting rollers.

13. The apparatus as claimed in claim 11, wherein the elastic layers are formed on tops of the first and second projections of the first and second guide rollers.

14. The apparatus as claimed in claim 11, wherein the first and second recessed portions and the first and second projections cooperate to define a radial clearance between the elastic layers which is adapted to be smaller than a thickness of the sheet material.

15. The apparatus as claimed in claim 11, wherein the elastic material comprises urethane.

16. The apparatus as claimed in claim 10, wherein the first and second recessed portions of the first and second cutting rollers and the first and second projections of the first and second guide rollers cooperate to define an axial clearance therebetween which is adapted to be greater than a thickness of the sheet material.

17. The apparatus as claimed in claim 11, wherein the first and second recessed portions of the first and second cutting rollers and the first and second projections of the first and second guide rollers cooperate to define an axial clearance therebetween which is adapted to be greater than a thickness of the sheet material.

18. The apparatus as claimed in claim 10, wherein the first cutting roller, the first guide roller, the second cutting roller and the second guide roller are adapted to cooperate in forming a generally S-shaped path of the sheet material along outer circumferential surfaces thereof.

19. A method for cutting a sheet material into strips, comprising:

guiding the sheet material in a first direction so as to form a generally S-shaped path of the sheet material as viewed in section taken along the first direction; and cutting the sheet material into the strips parallel to the first direction at a cutting position spaced from opposed ends of the sheet material in a second direction perpendicular to the first direction, while supporting the sheet material from opposite sides of the sheet material at support positions located in a spaced relation in the second direction, the cutting position being located between the support positions.

20. The method as claimed in claim 19, wherein upon cutting the sheet material, the sheet material is elastically supported from the opposite sides thereof at auxiliary support positions located between the cutting position and the support positions.

* * * * *